March 24, 1953   P. O. PFEIFFER   2,632,673
BALANCING DEVICE

Filed Feb. 7, 1948   2 SHEETS—SHEET 1

INVENTOR
Paul O. Pfeiffer
BY Evans + McCoy
ATTORNEYS

March 24, 1953   P. O. PFEIFFER   2,632,673
BALANCING DEVICE

Filed Feb. 7, 1948   2 SHEETS—SHEET 2

INVENTOR
Paul O. Pfeiffer
BY Evans & McCoy
ATTORNEYS

Patented Mar. 24, 1953

2,632,673

UNITED STATES PATENT OFFICE 2,632,673

BALANCING DEVICE

Paul O. Pfeiffer, Akron, Ohio, assignor to The General Tire and Rubber Company, Akron, Ohio, a corporation of Ohio Application February 7, 1948, Serial No. 6,881

22 Claims. (Cl. 301—5)

This invention relates to balancing devices for rotatable bodies and more particularly to balancers for wheel assemblies of vehicles.

It has been recognized that a state of unbalance in a vehicle wheel such as the rubber tired wheel of a passenger automobile gives rise to vibration which, even at moderate speeds, is apt to be objectionable to the passengers. At high speeds, vibration due to unbalance in a wheel or wheels may become quite severe and is apt to be dangerous.

Numerous expedients have been resorted to for the purpose of detecting and overcoming unbalance in rotating bodies. In testing a pneumatic vehicle tire and wheel assembly it is customary to determine static equilibrium by suspending the assembly on a single point pivot with its rotational axis vertical. The heavy side of the tire and wheel assembly thus swings downwardly. Another method involves mounting the wheel with its rotational axis horizontal for turning on sensitive low friction bearings so that the heaviest side of the tire swings or turns to the bottom. The operator then "balances" the tire and wheel assembly by applying one or more weights to the high or light side thereof to impart static balance to the assembly. The weights thus used to obtain static balance may be attached to the wheel rim as by spring clips or they may be embedded in the rubber of the tire. Some attention has also been given to the expedient of applying by cement or vulcanization, strips of rubber to the side walls of the tire.

While the application of weights to vehicle wheel assemblies as heretofore practiced gives static balance, it has been found that at high speeds wheels so balanced have not been entirely satisfactory and frequently lack dynamic balance. Furthermore, it is considered undesirable to attach weights or additional rubber to pneumatic tires and the attachment of weights to the wheel rims is not completely satisfactory because of appearance and the danger incident to detachment and loss at high speeds.

It is therefore one of the principal objects of the present invention to provide a generally improved means for balancing rotatable bodies such as vehicle wheel assemblies which will avoid or overcome the objections to present balancing weights mentioned above. More specifically, the invention is concerned with the provision of means for: supporting a balancing weight or weights relatively close to the plane of the center of mass of the rotating body or wheel; securely mounting a balance weight or weights so as to reduce the possibility of a weight becoming loose or detached in operation; mounting such weights out of sight in a conventional vehicle wheel assembly so as to be relatively inaccessible and tamper proof, and so mounting a weight or weights on a rotatable body that they can be readily moved or shifted to different circumferential positions about the rotational axis of the body during the balancing operation and then quickly and easily tightened in place to maintain the adjustment.

The principles of the invention are incorporated in a balancing device for use in connection with conventional vehicle wheel assemblies of passenger automobiles, although, of course, the same device or one with slight modification, can be used in balancing other rotatable bodies such as clutches, fly wheels, motors, couplings, and the like. In the designing of a balance weight of the character herein contemplated for use in passenger automobile applications, it is desirable to provide a structure which is of general utility in a large number of makes and models of automobiles so that the device can be economically mass produced and thereby made available to the public at relatively low cost. This goal is therefore another objective of the invention and has been achieved in large measure by the use of universal weights and weight supporting rings of general application in most automobile models and makes in combination with attaching and supporting means for the rings which are of resilient character and either deformable, reversible, or both, to suit the particular requirements of the wheel assembly with which the device is to be used. As a further refinement of this aspect of the invention interchangeable supporting clips or brackets are provided with the balancing rings and weights for alternative use in accordance with the requirements of any particular installation, the clips or brackets being relatively simple and cheap and easily secured to the weight supporting rings.

A further object is to provide a weighting device which facilitates the static balancing of a wheel assembly by permitting circumferential movement of a balancing weight or weights about the rotational axis of the assembly over a predetermined confined circular or arcuate path.

Other objects and advantages of the invention relate to certain details of construction and arrangements of parts and will become apparent in the following detailed description made in connection with the accompanying drawings, forming a part of this specification. Like parts throughout the several views are indicated by the same numerals and letters of reference.

Figure 1:
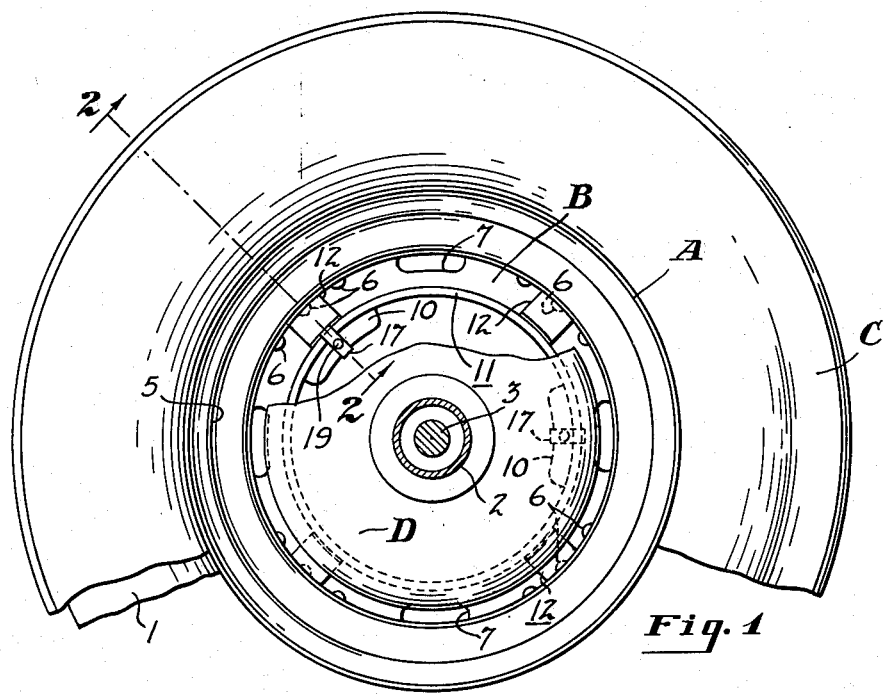
Figure 1 is an elevational view, partly in section and with parts broken away and removed, showing the balancing device of the present invention assembled with a wheel and tire of a conventional passenger automobile.
Figure 2:
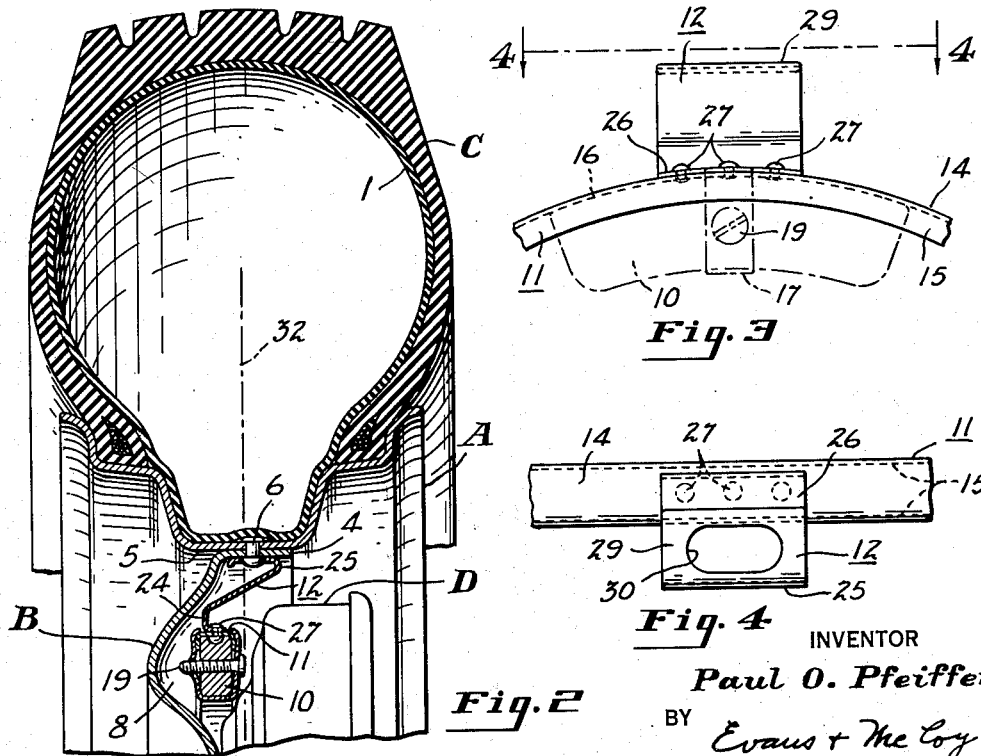
Fig. 2 is a fragmentary transverse sectional view through the assembly of Fig. 1, taken substantially on the line indicated at 2—2 of Fig. 1 and enlarged.
Figure 3:
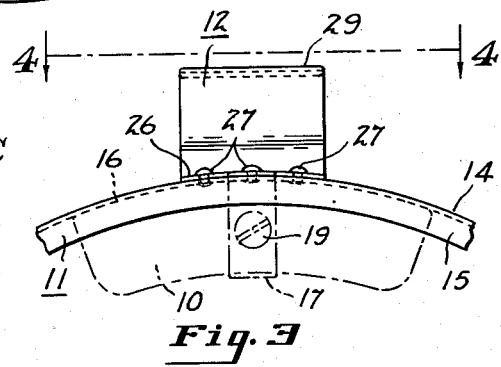
Fig. 3 is an enlarged elevational detail of a segmental portion of the weight mounting ring showing also a weight and one of the attaching brackets or clips.

Wheel assemblies of conventional passenger automobiles and like vehicles are of somewhat similar design and construction on all of the popular or common makes and models. Although the balance weight of the present invention has other uses and applications it is particularly adapted to use with such wheel assemblies. Each wheel includes an annular rim A which may be of the drop center type secured to the periphery of a circular wheel disc B. Pneumatic vehicle tire C inflated by inner tube I is supported on the rim A and the wheel disc B is demountably bolted to a hub assembly which includes an integral or welded on brake drum D that rotates as part of the wheel assembly. The hub of the brake drum assembly includes a tubular portion 2 which surrounds and is mounted upon shaft or axle 3 of the vehicle.

The shape and configuration of the wheel disc B varies among the different makes of automobiles and may even differ from year to year and between various models of the same make. At the outer periphery of the wheel disc the latter is formed with a number of integral, laterally directed, circumferential flange portions 4 which are received against cylindrical drop center portion 5 of the rim A and are welded thereto or secured by rivets 6. The attaching flanges 4 are spaced about the circumference of the wheel and intermediate portions of the disc B may be cut away or removed to provide apertures 7 for use in attaching chains or other non-skid devices about the wheel. Between the wheel disc B and the brake drum D and located radially inwardly of the smallest diameter portion of the wheel rim A is an annular space or partially enclosed annular chamber 8 which, in the wheel designs of most automotive manufacturers, is free and unobstructed around the entire circumferential extent of the brake drum. The wheel assembly described above is conventional and the present invention is concerned with the utilization of the partially enclosed annular chamber 8 to house or contain a wheel balance and the provision of a balancing weight means of general or universal application, suitable for mounting therein.

The balancing means comprises one or more weights 10 (two being used in most cases) which are adjustably carried by a supporting ring 11 mounted in concentric relation to the rotational axis of the wheel assembly by means of brackets or resilient leaf spring clips 12 spaced circumferentially about the ring 11. The bracket clips extend radially from the ring to the wheel rim A or the disc flange 4 disposes against the wheel rim.

The supporting ring is of channel shape in cross section having a flat bottom portion 14 and spaced substantially parallel flanges 15. The ring is formed as by stamping or rolling metal strips to the desired cross sectional shape, bending them to circular ring-like form, and butt welding the meeting ends. The channel of the supporting ring opens or is directed radially inwardly toward the rotational axis of the device and receives the weights 10 for circumferential sliding movement to different positions about the ring circumference.

The weights are formed to fit between the ring flanges 15 which thus laterally confine the weights and guide the latter as they are moved or shifted to different positions of adjustment in balancing the wheel assembly. Arcuate or curved outer edges or faces 16 of the weights conform to the curvature of the ring bottom 14. To retain the weights in the ring channels, U clips 17 conveniently made in the form of sheet metal stampings are disposed in embracing relation about central portions of the weights and have ends 18 formed or bent laterally toward one another about the ring 11 so as to engage behind the bottom 14 of the latter, thereby preventing withdrawal of the weights. Screws 19 hold the clips and weights together. Each screw, having a running fit in an opening in one leg 20 of one of the U clips 17 and in an aligned opening 21 of the embraced weight 10, is threadedly engaged in an aperture 22 in the other leg of the U clip. By tightening the screws the legs of the U clips are made tightly to clamp the supporting ring 11 in frictional grips which strongly resist circumferential movement of the weights and lock the latter in adjusted positions. Loosening of the screws 19 relieves the frictional grip or lock, permitting the weights to be slid circumferentially about the supporting rings while yet retaining the weights interlocked with the rings and seated in the channels thereof.

The mounting clips 12 are of substantially Z shape and are formed as by stamping of resilient material such as sheet steel. Each has one or more reverse bends such as the bends 24 and 25 which permit radial deformation of the brackets in assembling the device within the wheel rim.

Conventional wheels of the character described above customarily have four of the flanges 4 which secure the wheel discs to the wheel rims, each flange being secured by a plurality of the rivets 6. Accordingly, the rings 11 are fitted with four of the supporting clips or brackets 12 which thus correspond in number to the wheel disc flanges. A greater or lesser number of the spring brackets may be used, the exact number being largely influenced by the wheel design and the number of attaching points or rivet groups incorporated therein. Base 26 of each clip is secured to the outer face of ring bottom 14 by rivets 27. The swaged over ends of the rivets extend into the ring channel and a longitudinal groove 28 is formed in the bottom 16 of each of the weights 10 to receive the rivet ends so that the weights can be shifted circumferentially in the rings without interference between the rivets and the weights.

Figure 4:
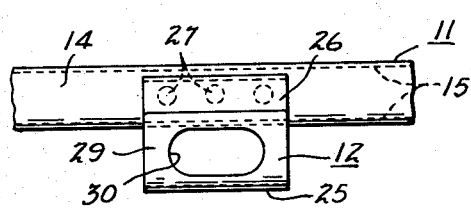
Fig. 4 is a plan view of the parts shown in Fig. 3, being taken along the line indicated at 4—4 of that figure.

The outer end or foot portion 29 of each of the resilient Z brackets 12 is formed with an aperture 30 which is received near the head of one of the wheel rivets 6 so that the foot of the bracket seats flatwise against the inwardly directed face of the rim or disc flange 4. As shown in Fig. 4 some of the bracket apertures 30 are circumferentially elongated to accommodate slight misalignment or mislocation of the wheel rivets 6. The aperture in one of the bracket clips is circular, however, to snugly embrace one of the rivet heads to prevent circumferential shifting of the balance ring in the assembly. In their unstressed condition the supporting clips or brackets 12 extend radially outward beyond the positions illustrated in the drawings so as to be compressed or deformed in assembly to maintain continuous outward pressure against the wheel rim or disc flanges.

The extent and shape of the Z brackets are governed by the shape of the annular chamber 8 in the particular wheel assembly design with which the balancing device is to be employed. For each wheel design the clip or brackets 12 are shaped so as to locate the ring 11 in or as close to the plane of the center of mass of the rotating wheel assembly as possible, while yet maintaining the balance weight device freely suspended within the chamber 8 and clear of the disc B and the brake drum D. Although there is no inherent objection to contact between the balance device and the parts of the wheel assembly, it is preferable to maintain the balance ring in freely suspended position supported only by the resilient brackets 12 so as to avoid vibration and rattle.

By thus locating the balance device substantially in the plane of the center of mass of the rotating parts of the wheel assembly, dynamic balance of the complete assembly is more readily achieved, even at high rotational speeds. Thus it has been found that employing a pair of weights of about eight ounces each which are spaced apart varying amounts depending upon the degree of unbalance found, but which are located equidistantly on opposite sides of the high or light point of the wheel assembly as determined by static balancing such as described above, results in a balanced assembly that operates at high speeds such as sixty to eighty or more miles per hour without objectionable vibration and with good dynamic balance. In most wheel constructions, the center of mass of the assembly lies closely adjacent the center line of the tire and rim indicated at 32 in the drawing. Thus it is apparent that the balance ring of the present invention enables the balance weights to be disposed in a plane which includes or is closely adjacent to the center line of the tire and the plane of the center of mass.

In Figs. 5 through 8 are illustrated modifications in which the supporting brackets or clips 12 are reversed or are formed to different shapes or the entire balance ring is reversed in the assembly so as to support the balance ring in different parts of the annular chamber 8 in wheel and drum designs of different character.

Figure 5:
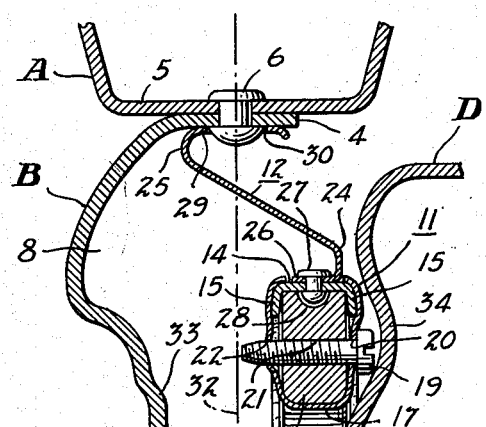
Figs. 5 through 8 are fragmentary sectional details corresponding to Fig. 2, enlarged with respect to that figure, and with parts broken away and removed, to show the use of the invention in different styles and models of wheel assemblies.

Fig. 5 illustrates a construction in which the supporting clips or brackets are the same as those illustrated in Figs. 1 through 4. In the Fig. 5 combination, however, the ring 11 is reversed so that it is disposed to the right of the tire center line 32 instead of to the left as in Fig. 2. This reversing of the ring 11 is an expedient by which the balance weights can be shifted axially side to side into a position adjacent to the plane of the center of mass of the rotating assembly. This reversing of the weight supporting ring also permits the clip design of Figs. 1 through 5 to be used in different models and types of wheel and brake drum assembly. For example, in the construction of Fig. 2 the annular chamber 8 lies largely to the left of the plane of the attaching rivets 6 over which the spring clips 12 are snapped into place, whereas in Fig. 5 the chamber 8 extends sufficiently to the right of the plane of the rivets 6 to permit the weight ring 11 to be disposed inside or to the right of the plane of the rivets. In the construction of Fig. 5 a re-entrant portion 33 of the wheel disc B prevents locating the weight supporting ring 11 on the left side of the plane of the rivets 6 while an annularly extending concave portion 34 of the brake drum D accommodates the weights 10 and the ring supporting the same.

Figure 6:
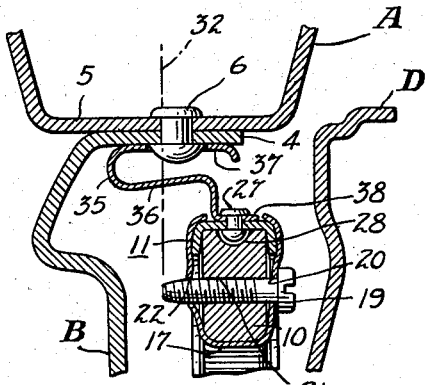

In Fig. 6 is illustrated a modified clip design in which a reverse bend 35 of approximately 180° or more in extent imparts a U shape to the bracket or clip, indicated generally at 36. An apertured foot 37 is received over one of the rim rivets 6 and corresponds to the foot 29 of the clip brackets of the preceding figures. The rivets 27 through the weight supporting ring 11 are attached through apertures in base portions 38 of the bracket clips, corresponding to the base portions 26 of the preceding brackets. This embodiment of the clip is used in assemblies wherein the diameter of the weight supporting ring 11 is only slightly smaller than that of the inside of the wheel rim A. The clip brackets 36 are of relatively short circumferential extent and are spaced from one another about the circumference of the ring 11 similarly to the clips 12.

Figure 7:
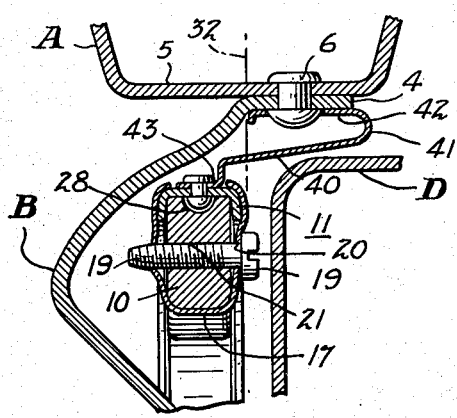

Fig. 7 illustrates a modification in which clip brackets, one of which is indicated at 40, spaced circumferentially about the weight supporting ring 11, are formed with acute reverse bends 41 corresponding to reverse bend 35 of the Fig. 6 modification. Foot and base portions 42 and 43 correspond to the foot and base portions 37 and 38 respectively of the Fig. 6 clip bracket, the base portions being secured to the weight ring 11 by the rivets 27 and the foot portions being apertured to receive the rivets 6 of the wheel rim. This particular type of clip bracket is of utility in a wheel and brake drum of the type in which the brake drum D extends into the plane of the wheel rivets 6 requiring a relatively greater later offset of the weight supporting ring 11 with respect to the foot portion 42 of the clip brackets than in required in the wheel assembly of the preceding figures.

Figure 8:
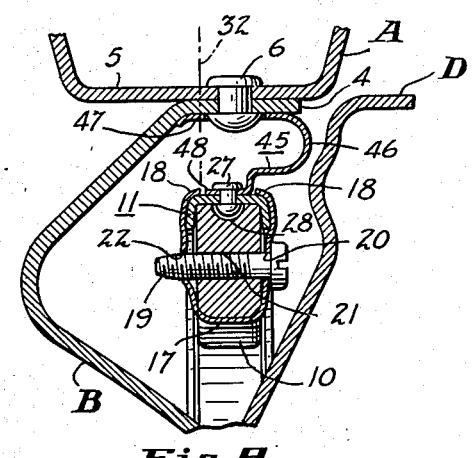

In Fig. 8 is illustrated another modification in which the weight supporting ring 11 is carried by a number of circumferentially spaced brackets or clips 45 each having a reverse bend 46. In this design the body portion of each clip, extending between foot 47 and base 48, is relatively short so that the channeled ring 11 is disposed approximately in the plane of the wheel rivets 6.

Figure 9:
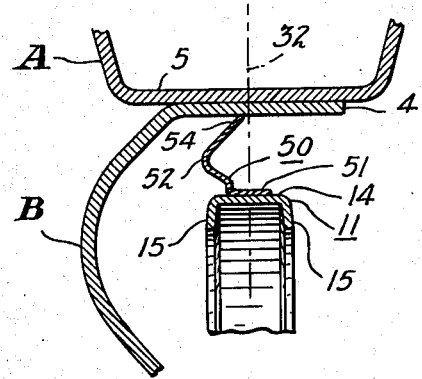
Fig. 9 is an enlarged sectional detail, also corresponding to Fig. 2, showing a modification of the invention in which the resilient supporting brackets or clips are formed with sharp edges to bite into the internal face of the wheel rim assembly.
Figure 10:
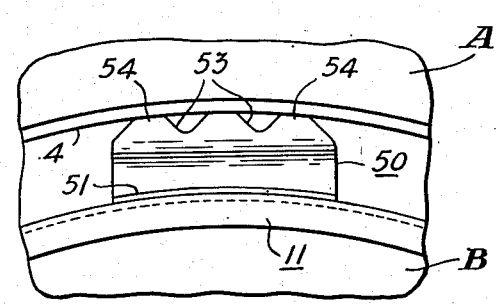
Fig. 10 is a fragmentary elevational detail of the structure of Fig. 9.

Figs. 9 and 10 illustrate a further modification for use in wheel assemblies of the type having the flange portions 4 of the disc B integral with or welded to the drop center portion 5 of the rim A. Disposed about the outer face of the weight supporting ring 11 in circumferentially spaced relation are a number of resilient spring clips or brackets 50 having base portions 51 soldered, brazed, or spot welded to the outside surface of the bottom 14 of the channel ring 11. The spring brackets or clips 50 are formed as by stamping from thin resilient material such as sheet spring steel and are formed with reverse bends 52 which impart a spring-like character to the clips for radial deformation or movement. The outer edge of each of the clips or brackets is formed with notches 53 giving a serrated character thereto and providing a plurality of relatively narrow prongs or teeth 54. In its unstressed condition each of the spring clips 50 extends radially outward to a greater diameter than that illustrated in the drawings so that as the balance device is pressed into place within the wheel rim A the spring clips 50 are radially compressed, forcing the teeth 54 to bite into the inner faces of the flange portions 4 of the wheel disc B. Although the weight supporting ring 11 of Figs. 9 and 10 is shown disposed approximately in the plane of the center line 32 of the wheel assembly, it is contemplated to shift or adjust the position of the balance device axially, if necessary, so as to lie closely adjacent the plane of the center of mass of the rotating assembly. By reason of the biting grip of the clip teeth 54 in the disc flanges 4 the weight ring 11 can be moved to different positions axially and securely held against both circumferential and axial displacement.

In balancing a wheel assembly using the device of the present invention the ring 11 is first positioned within the wheel and held in place by the spring clips or brackets illustrated, after which a trial balance is made to determine the high or light side of the assembly. The weights 10 are then moved circumferentially on the ring to an approximate balance position while the entire assembly remains supported on the wheel balancing pivot. The operator then imparts slight circumferential movements to the individual weights 10 so as to obtain the optimum balance condition. Thereafter the balance weights are locked in place by tightening the screws 20 and the wheel is immediately ready for mounting on the vehicle. The ease with which the weights 10 can be shifted circumferentially facilitates the balancing operation and results in greater accuracy than prevails with conventional methods requiring the direct attachment of the weights to the wheel rim.

In accordance with the patent statutes the principles of the present invention may be utilized in various ways, numerous modifications and alterations being contemplated, substitution of parts and changes in construction being resorted to as desired, it being understood that the particular embodiments shown in the drawings and described above are given merely for purposes of explanation and illustration without intending to limit the scope of the claims to the specific details disclosed.

What I claim is:

1. A device for balancing a rotatable body comprising a substantially circular ring having a bottom and spaced substantially parallel radial side flanges, each side flange being narrower than the bottom, a weight and means for securing the same in different positions of circumferential adjustment about the ring, the ring and the weight being formed for interfitting relation so that the ring guides the weight as the latter is moved to different positions of adjustment and the weight being of greater radial depth than the side flanges of the ring, and a plurality of spaced elements secured to the ring and extending therefrom for spacing the ring from the body and for supporting the ring thereon in concentric relation to the rotational axis of the body.

2. Balancing means for use in combination with a vehicle wheel of the type having an annular tire mounting rim and a supporting disc comprising a ring smaller than the minimum rim diameter, said ring having a bottom and spaced substantially parallel radial side flanges, each side flange being narrower than the bottom, a weight and means for securing the same to the ring in different positions of circumferential adjustment, and resilient means for supporting the ring within the wheel rim and adjacent the disc.

3. Balancing means for use in combination with a vehicle wheel of the type having an annular tire mounting rim and a supporting disc comprising a ring smaller than the minimum rim diameter, said ring having a bottom and spaced substantially parallel radial side flanges, each side flange being narrower than the bottom, a weight of greater radial depth than the ring side flanges and means for securing the same to the ring in different positions of circumferential adjustment, and means for supporting the ring in spaced relation concentrically within the rim.

4. Balancing means for use in combination with a vehicle wheel of the type having an annular tire mounting rim and a supporting disc with rivets securing the disc and rim together, the balancing means comprising a ring, a weight and means for securing the same to the ring in different positions of circumferential adjustment, and elements secured to the ring at spaced intervals and radiating therefrom, the elements being formed for embracing interfitting relation with the rivets of the wheel to support the ring in predetermined substantially concentric relation to the rim and to resist circumferential shifting of the ring relative to the rim.

5. A device for balancing a vehicle wheel of the type having an annular tire mounting rim comprising a substantially circular ring, a weight and means for securing the same in different positions of circumferential adjustment about the ring, a plurality of elements spaced about the ring for extending between the latter and the wheel rim to support the ring on the rim, and means attaching the supporting elements to the ring for turning movement about axes substantially radial with respect to the ring center, said elements being thus reversible on the ring for altering the relative position of the ring with respect to the rim.

6. In combination with a vehicle wheel having a rim structure which includes an annular inwardly directed face, a ring disposed inwardly of the rim face, a plurality of resilient elements carried by the ring extending radially outward therefrom, said elements having angularly disposed portions yieldingly held flatwise against the rim face to support the ring in uniformly spaced relation to the rim, one or more weights movable to different positions about the ring, and means for retaining the weights in fixed relation to the ring.

7. In combination with a vehicle wheel having a rim structure which includes an annular inwardly directed face, a ring disposed inwardly of the rim face, and formed with radially extending flange means, a plurality of resilient elements carried by the ring extending radially outward therefrom, said elements having angularly disposed portions yieldingly held flatwise against the rim face to support the ring in uniformly spaced relation to the rim, one or more weights movable to different positions about the ring and engageable with the ring flange means to prevent axial displacement of the weights, and means for retaining the weights in fixed relation to the ring.

8. In combination with a vehicle wheel having a rim structure which includes an annular inwardly directed face, a ring disposed inwardly of the rim face, and formed with a pair of uniformly spaced radial flanges, a plurality of resilient elements carried by the ring extending radially outward therefrom, said elements having angularly disposed portions yieldingly held flatwise against the rim face to support the ring in uniformly spaced relation to the rim, one or more weights movable to different positions about the ring, and receivable between the flanges thereof to prevent axial displacement of the weights and means for retaining the weights in fixed relation to the ring.

9. In combination with a vehicle wheel having a rim structure which includes an annular inwardly directed face, a ring substantially of channel shape in cross section disposed inwardly of the rim face, a plurality of resilient elements carried by the ring extending radially outward therefrom, said elements having angularly disposed portions yieldingly held flatwise against the rim face to support the ring in uniformly spaced relation to the rim, and one or more weights receivable in the ring channel and movable to different positions about the ring in balancing the wheel combination.

10. In combination with a vehicle wheel having a rim structure which includes an annular inwardly directed face, a ring spaced inwardly from the rim face, elements extending across the space between the rim and the ring, said elements having angularly extending end portions disposed flatwise against the rim face and supporting the ring in substantially concentric relation to the rim, a weight, and means for securing the weight to the ring in different circumferential positions.

11. In combination with a vehicle wheel having a rim structure which includes an annular inwardly directed face, a ring, a plurality of resilient elements formed with reverse curves and extending between the rim and the ring to support the latter on the rim, a weight, and means for securing the weight to the ring in different circumferential positions.

12. In combination with a vehicle wheel having a rim structure which includes an annular inwardly directed face, a ring, a plurality of resilient leaf springs secured to the ring at spaced intervals and radiating therefrom, the springs being compressed with outer portions thereof disposed flatwise against the rim face and being held thereagainst by the inherent resiliency of the springs to support the ring in substantially concentric relation to the rim, a weight, and means for securing the weight to the ring in different circumferential positions.

13. In combination with a vehicle wheel assembly which includes a rim structure having a substantially circular inwardly directed face, a wheel disc having peripheral flange means disposed against said rim face, and rivets extending through the flange means to secure the rim and disc together, said rivets having heads protruding radially inward from the flange means, a ring disposed within the rim structure, in substantially uniformly spaced relation thereto, resilient elements extending between the rim structure and the ring to support the latter for limited radial displacement, said elements having portions apertured to receive the heads of the rivets, one or more weights movable about the ring to different positions in balancing the assembly, and means for securing the weights in fixed balancing positions.

14. A device for balancing a rotatable body comprising a substantially circular ring substantially channel shaped in cross section and having spaced substantially parallel radial side flanges, a weight of greater radial depth than the side flanges of the ring slidingly receivable between the side flanges of the ring and slidable both circumferentially thereabout in adjusting the weight to different positions with respect to the ring and radially in removing the weight from and inserting the weight into the channel of the ring, means for retaining the weight in adjusted position within the ring channel, and a plurality of elements secured to the ring and extending laterally therefrom for attachment to the body to be balanced in supporting the ring in concentric relation to the rotational axis of the body.

15. A device for balancing a rotatable body comprising a substantially circular ring substantially channel shaped in cross section and having spaced side flanges, the ring channel opening radially inwardly toward the center of the ring, a plurality of support elements spaced circumferentially about the ring for attaching the ring to a body to be balanced in concentric relation to the rotational axis of the body, a weight of greater radial depth than the ring channel disposed in such channel between the ring flanges for sliding movement circumferentially about the ring in adjusting the weight to different positions with respect to the ring, the weight and the ring being complementally formed to permit radial sliding movement of the weight relative to the ring for radial insertion of the weight into and radial withdrawal of the weight out of the ring channel substantially at any point about the ring circumference, and means holding the weight in adjusted position in the channel.

16. A device for balancing a rotatable body comprising a substantially circular ring substantially channel shaped in cross section and having spaced side flanges, the ring channel opening radially inwardly toward the center of the ring, a plurality of support elements spaced circumferentially about the ring for attaching the ring to a body to be balanced in concentric relation to the rotational axis of the body, a weight disposed in the ring channel between the ring flanges and seated against the bottom of the channel, said weight being slidable circumferentially about the ring in adjusting the weight to different positions with respect to the ring, the weight and the ring being complementally formed to permit radial sliding movement of the weight relative to the ring for radial insertion of the weight into and radial withdrawal of the weight out of the ring channel substantially at any point about the ring circumference, the weight having a surface contacting and slidable over the surface of the channel bottom during said circumferential sliding of the weight relative to the ring to locate the weight in predetermined position radially with respect to the ring in said adjusting, and means clamping the weight against the channel bottom to hold the weight in adjusted position relative to the ring.

17. A device for balancing a rotatable body comprising a substantially circular ring substantially channel chaped in cross section and having spaced side flanges, the ring channel opening radially inwardly toward the center of the ring, a plurality of support elements spaced circumferentially about the ring for attaching the ring to a body to be balanced in concentric relation to the rotational axis of the body, a weight disposed in the ring channel between the ring flanges for sliding movement circumferentially about the ring in adjusting the weight to different positions with respect to the ring, the weight and the ring being complementally formed to permit radial sliding movement of the weight relative to the ring for radial insertion of the weight into and radial withdrawal of the weight out of the ring channel substantially at any point about the ring circumference, the weight and the ring being formed with confronting surfaces within the channel in contacting relation and which confronting surfaces slide one along the other during said circumferential sliding movement of the weight about the ring to locate the weight in predetermined position radially with respect to the ring in said adjusting, the ring surface being directed radially inward and the weight surface being directed radially outward so that during rotation of the device centrifugal force presses the confronting surfaces together, and means holding the weight in adjusted position in the channel.

18. A device for balancing a rotatable body comprising a substantially circular ring substantially channel shaped in cross section and having spaced side flanges, the ring channel opening radially inwardly toward the center of the ring, a plurality of support elements spaced circumferentially about the ring for attaching the ring to a body to be balanced in concentric relation to the rotational axis of the body, a weight disposed in the ring channel between the ring flanges for sliding movement circumferentially about the ring in adjusting the weight to different positions with respect to the ring, the weight and the ring being complementally formed to permit radial sliding movement of the weight relative to the ring for radial insertion of the weight into and radial withdrawal of the weight out of the ring channel substantially at any point about the ring circumference, and a substantially U shaped clip in contacting embracing relation to both the weight and the ring to hold the weight in adjusted position in the channel.

19. A device for balancing a rotatable body comprising a substantially circular ring substantially channel shaped in cross section and having spaced side flanges, the ring channel opening radially inwardly toward the center of the ring, a plurality of support elements spaced circumferentially about the ring for attaching the ring to a body to be balanced in concentric relation to the rotational axis of the body, a weight disposed in the ring channel between the ring flanges for sliding movement circumferentially about the ring in adjusting the weight to different positions with respect to the ring, the weight and the ring being complementally formed to permit radial sliding movement of the weight relative to the ring for radial insertion of the weight into and radial withdrawal of the weight out of the ring channel substantially at any point about the ring circumference, a substantially U shaped clip in contacting embracing relation to both the weight and the ring, and means for clamping the clip on the ring to hold the weight in adjusted position in the channel.

20. A device for balancing a rotatable body comprising a substantially circular ring substantially channel shaped in cross section and having spaced side flanges, the ring channel opening radially inwardly toward the center of the ring, a plurality of support elements spaced circumferentially about the ring for attaching the ring to a body to be balanced in concentric relation to the rotational axis of the body, a weight disposed in the ring channel between the ring flanges and seated against the bottom of the channel, said weight being slidable circumferentially about the ring in adjusting the weight to different positions with respect to the ring, the weight and the ring being complementally formed to permit radial sliding movement of the weight relative to the ring for radial insertion of the weight into and radial withdrawal of the weight out of the ring channel substantially at any point about the ring circumference, and a clip and means securing the clip to the weight, the clip having a portion disposed in overlying relation to the ring, the securing means being adjustable to tighten the clip to hold the weight in adjusted position in the channel and to loosen the clip to permit said circumferential sliding of the weight relative to the channel, and the clip serving to hold the weight in the channel and against the channel bottom.

21. A device for balancing a rotatable body comprising a substantially circular ring substantially channel shaped in cross section and having spaced side flanges, the ring channel opening radially inwardly toward the center of the ring, a plurality of support elements spaced circumferentially about the ring for attaching the ring to a body to be balanced in concentric relation to the rotational axis of the body, a weight disposed in the ring channel between the ring flanges for sliding movement circumferentially about the ring in adjusting the weight to different positions with respect to the ring, the weight and the ring being complementally formed to permit radial sliding movement of the weight relative to the ring for radial insertion of the weight into and radial withdrawal of the weight out of the ring channel substantially at any point about the ring circumference, a substantially U shaped clip in contacting embracing relation to both the weight and the ring, and screw means extending through the clip and the weight to retain the clip captive on the weight, said screw means being arranged for tightening to effect clamping of the clip on the ring to hold the weight in adjusted position on the ring.

22. A device for balancing a rotatable body comprising a substantially circular ring substantially channel shaped in cross section and having spaced side flanges, the ring channel opening radially inwardly toward the center of the ring, a plurality of support elements spaced circumferentially about the ring for attaching the ring to a body to be balanced in concentric relation to the rotational axis of the body, a weight disposed in the ring channel between the ring flanges for sliding movement circumferentially about the ring in adjusting the weight to different positions with respect to the ring, the weight and the ring being complementally formed to permit radial sliding movement of the weight relative to the ring for radial insertion of the weight into and radial withdrawal of the weight out of the ring channel substantially at any point about the ring circumference, and a clip embracing the weight and the ring, said clip having leg portions extending radially over the outside surfaces of the ring flanges and angularly disposed ends on the leg portions directed toward one another in underlying relation to the ring to hold the weight in assembled relation on the ring while permitting said circumferential movement.

PAUL O. PFEIFFER.

References Cited

The following references are of record in the file of this patent:

UNITED STATES PATENTS

| Number | Name | Date |
|---|---|---|
| 2,280,637 | Kraft | Apr. 21, 1942 |
| 2,336,920 | Beaman | Dec. 14, 1943 |
| 2,359,248 | Rubsam | Sept. 26, 1944 |
| 2,361,406 | Lyon | Oct. 31, 1944 |
| 2,499,770 | Minder | Mar. 7, 1950 |

FOREIGN PATENTS

| Number | Country | Date |
|---|---|---|
| 627,995 | France | 1927 |
| 717,798 | Germany | Feb. 23, 1942 |